May 5, 1970        K. J. KUHN        3,509,783

REPAIR BRACKET FOR A TRANSMISSION HOUSING

Filed Oct. 8, 1968        3 Sheets-Sheet 1

INVENTOR
KONRAD J. KUHN
BY *James and Franklin*
ATTORNEYS

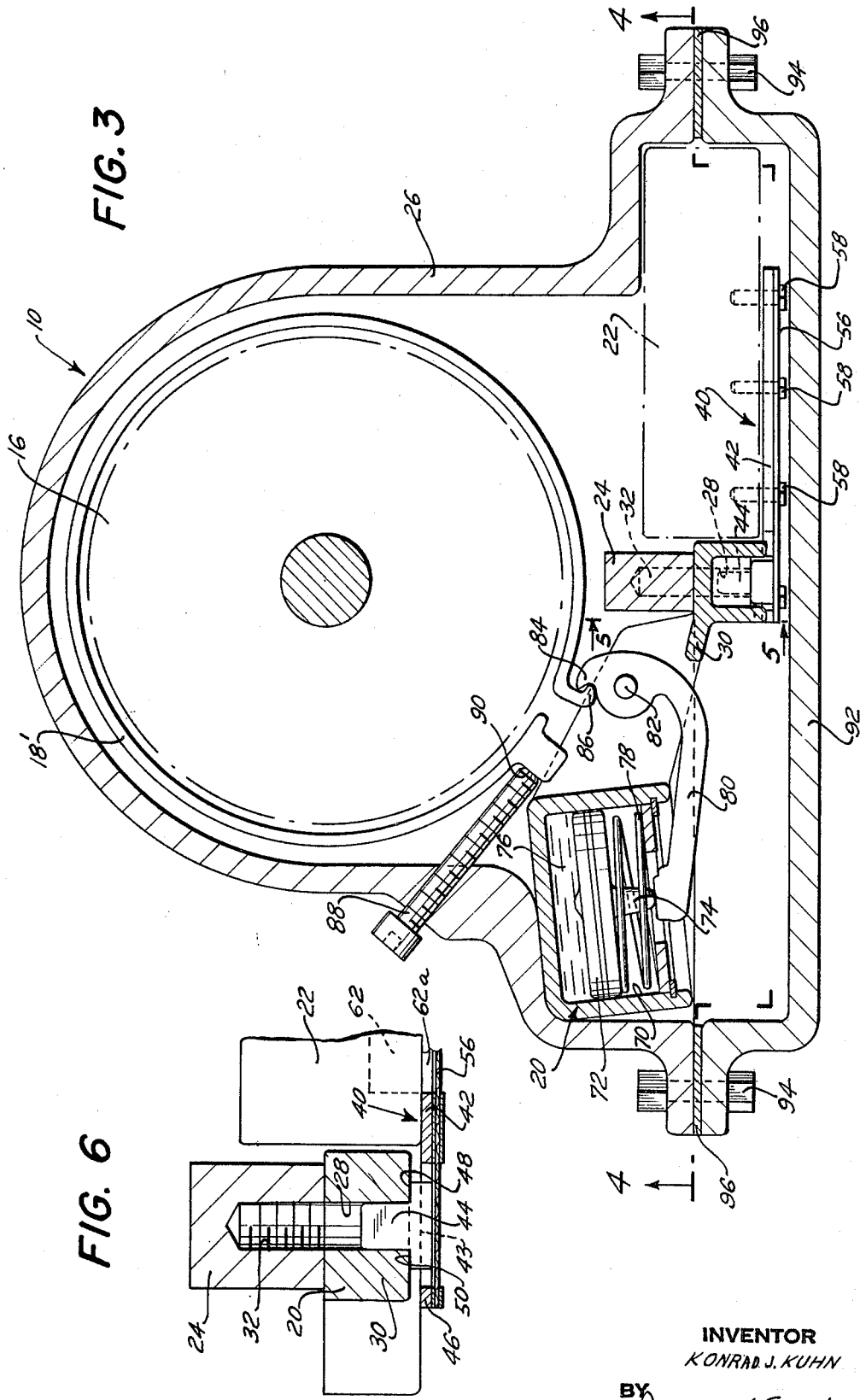

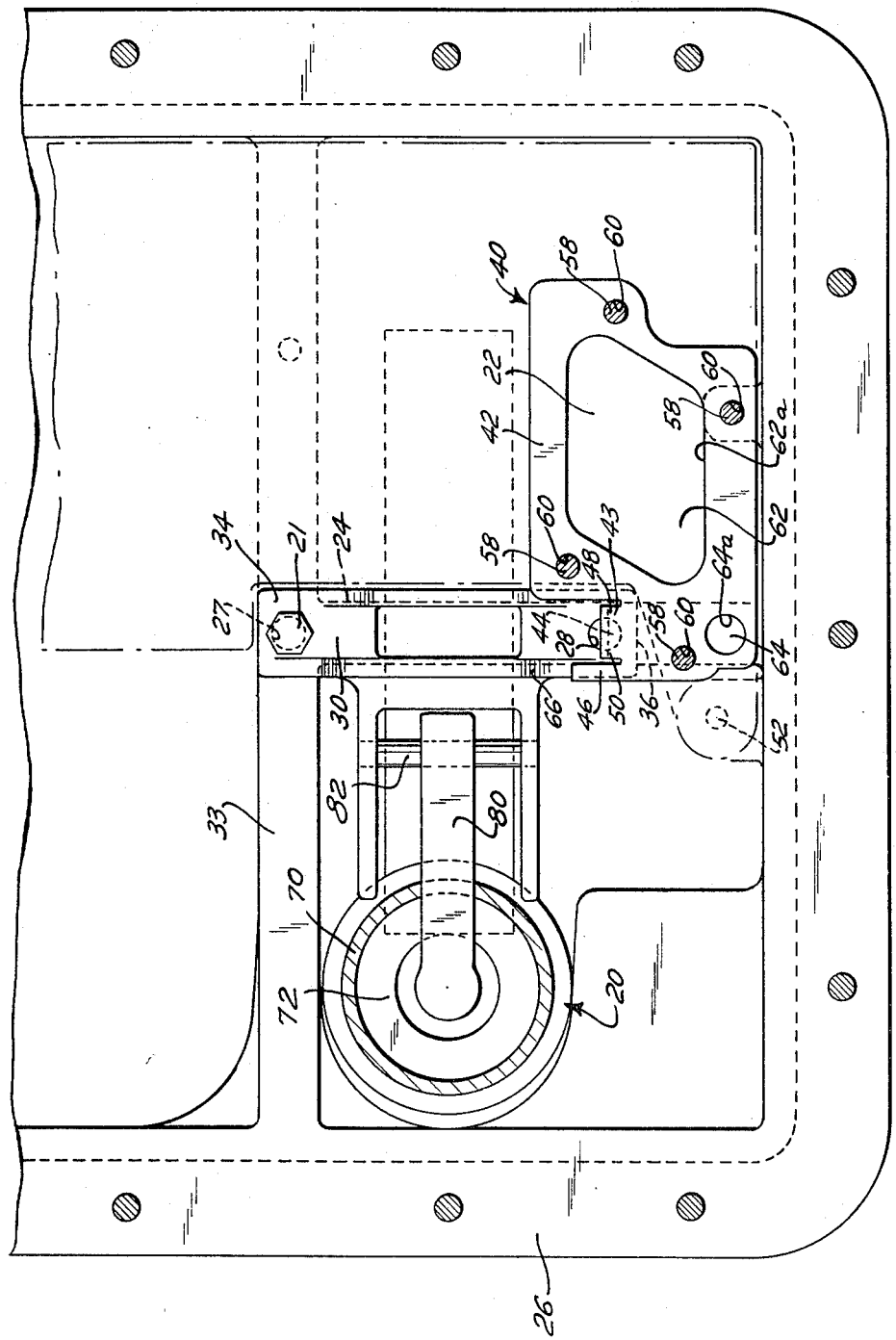

United States Patent Office 3,509,783
Patented May 5, 1970

3,509,783
REPAIR BRACKET FOR A TRANSMISSION HOUSING
Konrad J. Kuhn, Rocky Point, N.Y., assignor to All-O-Matic Manufacturing Corporation, New Hyde Park, N.Y., a corporation of New York
Filed Oct. 8, 1968, Ser. No. 765,953
Int. Cl. F16h *57/02;* B23p *7/04*
U.S. Cl. 74—606                    16 Claims

ABSTRACT OF THE DISCLOSURE

In some automatic transmissions where a servo asembly is mounted on a casing wall, the wall tends to crack as a result of forces exerted thereon by the servo assembly. In that event a repair bracket is secured to the casing independently of the cracked wall, the bracket being so formed as to engage the servo assembly and securely hold it in position.

---

The present invention relates to a repair bracket having particularly use in the repair of defective automatic transmission units such as those used in automobiles or the like.

In particular, the device of the present invention finds utility in the repair of the mounting of an automatic transmission servo assembly which is normally secured to a wall of the transmission casing. That assembly is effective when actuated to operate a lever to tighten a band around a rotating drum. The servo assembly is commonly controlled by a supply of hydraulic fluid which is supplied thereto at a controlled rate through a valve assembly, the operation of which is in turn controlled by an external system responsive to the engine speed. In this manner, different combinations of bands and clutches are automatically engaged in response to variations in the engine speed so that a proper gear reduction or transmission ratio is developed between the engine and the drive wheels of the vehicle. Thus, the transmission ratio or gear reduction ratio is made to automatically correspond to the engine speed.

In one construction of an automatic transmission such as that utilized in certain models of the Rambler American automobile, one of the servo assemblies is mounted adjacent to the valve assembly on a wall integral with the transmission casing and secured to that wall at two spaced points. One of those mounting points is located at an intersection between that wall and a second wall, but the second mounting point is located along that wall at a location where that wall is unsupported by other structure of the transmission casing.

When the servo assembly is actuated for band tightening, reaction forces are exerted on the casing, and stresses concentrate at the points where the servo assembly is secured to the casing. The assembly mounting is weakest at the second mounting point, where the casing wall is relatively unsupported, and cracks tend to form in the casing wall at that second mounting point. When the wall is cracked the servo assembly is improperly mounted and cannot adequately perform its band-tightening task. To attempt to repair the cracked casing wall is prohibitively expensive, time-consuming, and uncertain. As a result when such cracks appear it is usually necessary to replace the entire transmission unit, a matter of very significant cost.

It is an object of the present invention to provide an inexpensive device which can be incorporated into an automatic transmission unit to repair the unit when the wall supporting the servo assembly is cracked, without the need for repairing that wall, thereby avoiding the necessity of replacing the transmission unit.

It is a further object of the present invention to provide a repair bracket which can be readily incorporated into an automatic transmission unit to mount a servo assembly to the unit when the wall supporting the servo assembly is cracked, the bracket being secured to an adjacent assembly such as the valve assembly which controls the servo assembly.

The repair bracket of the present invention is in the form of a plate adapted to be secured to the casing independently of the cracked wall, and preferably by securing means pre-existing in the transmission assembly. In the form here specifically disclosed it is secured to an adjacent auxiliary assembly, which may be the very valve assembly used to control the servo assembly. The bracket has a first rigid part which is snugly received in an aperture in the servo assembly which normally receives a fastener engaging the casing wall at the crack-sensitive mounting point, but from which that fastener has been removed. The bracket has a second rigid part overlying and engaging an outer surface of the servo assembly. As a result the servo assembly is, through the action of the bracket, rigidly and securely mounted within the casing even though the casing wall is cracked and the crack has not been repaired.

The first bracket part may comprise a tongue extending substantially at right angles to the bracket plate. The second bracket part may comprise a pair of surfaces located at each side of the tongue which abut the servo assembly at each side of the aperture in which the tongue is received, and/or a rigid finger extending outwardly from the plate which abuts against a surface of the servo assembly spaced from that aperture. The first bracket part serves primarily to prevent side-to-side movement of the servo assembly, while the second bracket part serves primarily to prevent up-and-down movement thereof. The rigid finger may also engage a side of a projecting portion of the servo assembly, thereby also assisting in preventing side-to-side movement.

When the auxiliary assembly to which the bracket is secured is the valve assembly which controls the flow of a hydraulic fluid to the servo assembly, the bracket is provided with openings brought into registry with fluid flow openings in the valve assembly when the bracket is secured thereto, thereby to permit an unimpeded flow of fluid to the valve assembly. The bracket, in this arrangement, may be secured to the valve assembly by means of screws which normally fasten a fluid filter screen to the valve assembly, the bracket being interposed between the screen and the valve assembly. Apertures are provided in the bracket in registry with similar apertures in the screen and valve assembly to receive these screws.

When the servo assembly is mounted on the transmission casing as here disclosed, the repair bracket is able to handle the forces exerted thereon by the operation of the servo assembly for an indefinite period of time without further damage to the transmission unit.

It is noteworthy that the repair mounting of the servo assembly is accomplished without having to perform any machining operations whatsoever, and solely by removing pre-existing fasteners and reinserting them where appropriate into already-formed receiving apertures. Hence the repair operation is facilitated to a very great degree.

To the accomplishment of the above, and to such other objects as may hereinafter appear, the present invention relates to the construction and manner of use in a transmission unit of a repair bracket, as defined in the accompanying claims and as described in the specification, taken together with the accompanying drawings in which:

FIG. 3 is a vertical cross section of the transmission system of FIG. 1 in enlarged scale, illustrating the manner in which the bracket of FIG. 2 is incorporated therein;

FIG. 4 is a view taken along the line 4—4 of FIG. 3;

FIG. 6 is a view taken along the line 6—6 of FIG. 5.

The repair bracket of this invention has particular utility in the mounting of a servo assembly to the casing of an automatic transmission unit when a wall of that unit on which the servo assembly is normally mounted has cracked because of forces developed at that wall by the operation of the servo assembly.

Figure 1:
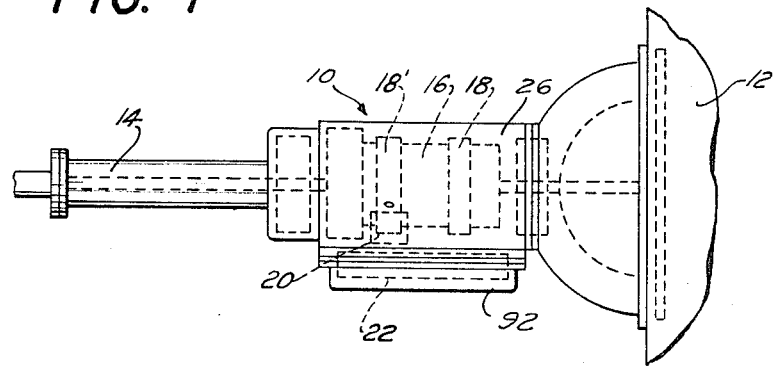
FIG. 1 is a schematic illustration of an automatic transmission system in which the present invention may be incorporated.

FIG. 1 schematically illustrates an automatic transmission unit of this type commonly used in a Rambler automobile, generally designated 10 and operatively connected between the engine 12 and the rear wheel drive 14 of the automobile. The transmission unit 10 includes a rotatable clutch drum 16 to which one or more bands, two of which are shown at 18 and 18' respectively, are selectively frictionally engaged with the drum upon the operation of a servo assembly such as 20. In the transmission unit, each band 18 is associated with an individual servo assembly, only one of which is shown in FIG. 1 for purposes of clarity.

The operation of the servo assemblies 20 is controlled by a supply of hydraulic fluid applied thereto in a controlled manner by a valve assembly 22, the functioning of which is controlled by means responsive to the engine speed.

In this manner, selected bands are engaged to the clutch drum, automatically and in different combinations, so as to develop a suitable gear reduction between the engine and the drive wheels which is proportional to the engine speed.

The details of the construction of the servo assembly and its associated parts in transmission unit 10 are shown best in FIGS. 3 and 4. The servo assembly 20 comprises a hollow cylinder 70 in which a piston 72 carrying a plunger 74 is free to move vertically. The operation of piston 72 is controlled by a supply of hydraulic fluid 76 which is introduced into cylinder 70 through control valves housed in valve assembly 22, a return spring 78 being active to return cylinder 72 to its upper position as viewed in FIG. 3. When piston 72 is moved downwardly by the force exerted by the hydraulic fluid, it causes a band lever 80 to pivot about an axis 82. A finger portion 84 of lever 80 then engages a lip 86 formed in band 18' so that when band lever 80 is pivoted, the band 18' is urged into intimate frictional engagement with the outer surface of clutch drum 16. A screw 88 passing through casing 26 abuts against a shoulder 90 formed at the other end of band 18' and may be set at a selected axial position to adjust the tension on the band.

With reference to FIGS. 3 and 4, it is seen there that the servo assembly 20 is mounted on a wall 24 which is formed integral with the casing 26 of the automatic transmission unit 10. The casing proper 26 is open at its bottom and has a bottom closure 92 secured thereto by fasteners 94, with a gasket 96 being provided between those two parts. Normally, servo assembly 20 is mounted on wall 24 by two fasteners (e.g. screws 21) passing through spaced apertures 27 and 28 formed in a mounting yoke member 30 of servo assembly 20 and entering registering threaded openings 32 formed in wall 24. The aperture 27 and its registering opening 32 define a first mounting point located in wall 24 where it joins at 34 with a second integral intersecting casing wall 33, the wall 33 constituting an extra strengthening support for adjacent sections of the wall 24. The aperture 28 and its registering opening 32 define a second mounting point located at a section of the wall 24 which is not provided with any such extra strengthening support. Said section of wall 33 has a tendency to crack as at 29 (FIG. 6) from the forces exerted thereat as a result of an operation of the servo assembly 20. If wall 24 remains cracked and is not replaced or repaired, the mounting of the servo assembly 20 is rendered ineffective.

The casing 20 is normally in the form of a metal casting. To repair a crack such as at 29 in such a metal casting is difficult, and requires that all parts be removed from the casing before repair operations can be carried out, and even then is of doubtful efficacy. Hence as a practical matter the occurrence of a crack 29 usually entails replacement of the entire automatic transmission assembly 10.

In accordance with the present invention a repair bracket generally designated 40 is utilized to mount the servo assembly 20 to the cracked wall 24 in a manner such that servo assembly 20 is once again effectively mounted on the casing 26, thereby to operate on the band and clutch members of the transmission unit without the necessity for repairing the cracked wall or replacing the transmission unit.

Figure 2:
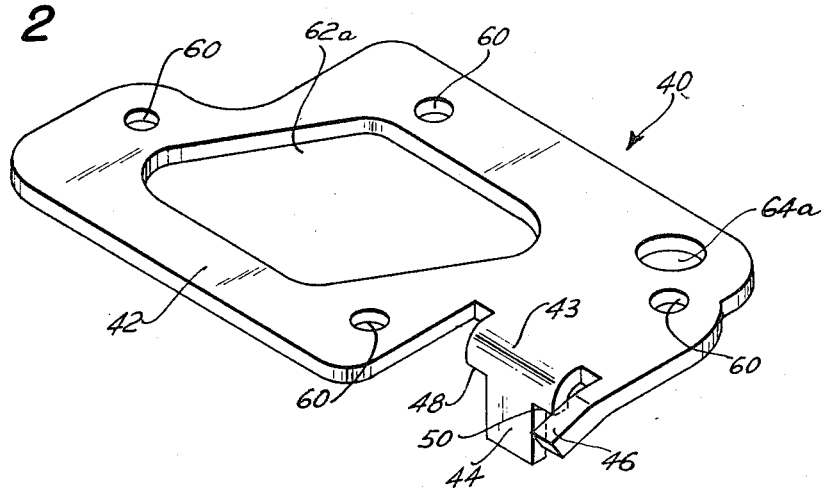
FIG. 2 is a three-quarter perspective view of the repair bracket of this invention.
Figure 5:
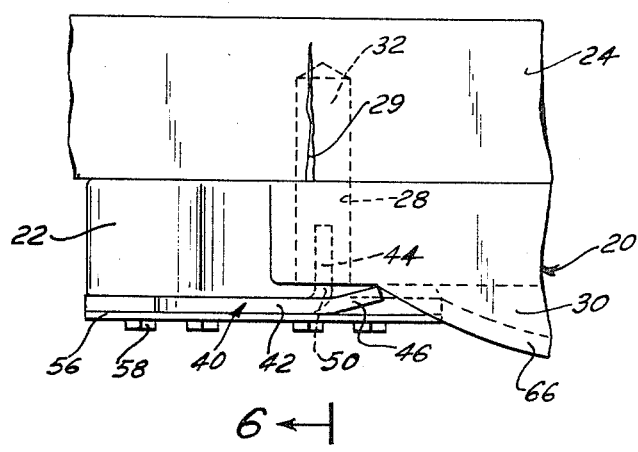
FIG. 5 is a view taken along the line 5—5 of FIG. 3.

As seen best in FIG. 2, the repair bracket 40 comprises a rigid metallic plate 42 approximately ¼" thick. A section 43 extends out from the plate 42 and a tongue 44 projects downwardly therefrom substantially normal to the plane of plate 42. A finger 46 extends from plate 42 to one side of the section 43. Finger 46 is bent slightly downwardly, as best shown in FIGS. 2 and 5. A pair of shoulders 48 and 50 are formed at each side of tongue 44 upwardly spaced from the tongue end.

An auxiliary assembly, here shown as the valve assembly 22 which controls the servo assembly 20, is located adjacent to the second mounting point of servo assembly 20 at aperture 28, and is secured to the casing 26 in any appropriate manner independently of the crack-susceptible wall section adjacent that second mounting point, such as at the location 52 (see FIG. 4). That valve assembly 22 is located near the bottom of the casing 26, where a supply of hydraulic fluid accumulates. The valve assembly has downwardly facing openings 62 and 64 which extend into the hydraulic fluid accumulation and respectively through which fluid flows into and out from the valve assembly 22. A fluid filter screen 56 is normally positioned on said downwardly facing surface areas to cover opening 62 and filter the fluid flowing thereinto, that screen 56 normally being held in place by means of a set of screws 58, suitable openings being provided in both the screen 56 and the valve assembly 22 to accommodate these screws.

Bracket 40 is adapted to be mounted on the valve assembly 22, thereby to be secured in position on the casing 10 independently of the cracked section of wall 24. It therefore is provided with a set of openings 60 which correspond in their locations to the location of the screw-receiving openings in screen 56 and in valve assembly 22. Bracket 40 is further provided with openings 62a and 64a which are adapted to register with, and which are of essentially the same size and shape as, the valve assembly openings 62 and 64 respectively.

When a crack 29 forms in the wall 24, one removes the servo-securing screw 21 which is provided for the opening 32 at the cracked wall section. The screen 56 is then removed from valve assembly 22 by the removal of screws 58, and bracket 40 is placed up against the exposed surface of valve assembly 22 so that its openings 60 are in registration with the screw receiving openings in valve assembly 22, and the tongue 44 is inserted into the now empty aperture 28 in servo assembly 20 left by the removal of the mounting screw 21. The width of tongue 44 should be substantially equal to the diameter of the hole to insure a snug fit of the tongue in the hole. Screen 56 is then placed up against bracket 40 with its screw receiving openings in registry with openings 60, and the screws 58 are inserted through the registering sets of openings in screen 56, bracket 40 and valve assembly 22, thereby to secure these parts into a unitary assembly.

When bracket 40 is so arranged and secured to valve assembly 22, the bracket shoulders 48 and 50 firmly rest on the lower surface of yoke member 30 of servo assembly 20 (FIG. 6), and the finger 46 firmly rests against the exposed side of a rib 66 (FIG. 5) formed in yoke member 30 and also engages the lower surface of the yoke member 30. Thus, the tongue 44, the finger 46 and the shoulders 48 and 50 engage the servo assembly 20 in such a manner as to rigidly mount it on casing 26 and prevent both vertical and lateral movement with respect to wall 24 and casing 26. Specifically, the engagement of finger 46 and shoulders 48 and 50 with the lower surface of servo assembly 20 prevents vertical movement, while the insertion of tongue 44 into opening 28, as well as the engagement of finger 46 with the side of rib 66, is effective to limit or prevent lateral movement of servo assembly 20 with respect to the casing 26.

Hence, servo assembly 20 can once again be operated in the desired manner even though wall 24 remains cracked, the servo assembly 20 now being rigidly held in place by the bracket 40 of the present invention independently of the cracked wall sections. The functioning of the valve assembly 22 is unimpaired, hydraulic fluid still flowing into and out of that assembly via the openings 62, 62a and 64, 64a in the assembly 22 and bracket 20 respectively, and still being filtered by the screen 56.

The repair is accomplished, it will be noted, without having to perform any machining or welding operations, but only by simple unscrewing and screwing operations, using (except for the bracket 20 itself) parts and attaching devices already present in the transmission assembly. Hence the repair can be carried out quickly and effectively, in a comparatively fool-proof manner, by relatively unskilled personnel and with elementary tools.

Thus, the present invention has provided an inexpensively fabricated bracket which can be easily used to repair a transmission unit when the wall carrying the servo assembly becomes cracked due to the forces developed during operation. The bracket provides a rigid, secure mounting of the servo assembly on the transmission casing, both vertical and lateral movement of the servo assembly being effectively prevented. The bracket may be easily and quickly installed in the transmission unit by relatively unskilled mechanics, and its installation renders unnecessary either the repair of the transmission unit wall, a difficult and uncertain operation at best, or the complete replacement of the transmission unit when the wall is cracked.

While only a single embodiment of this invention has been specifically herein disclosed, it will be apparent that variations may be made thereto without departing from the spirit and scope of the invention as defined in the following claims.

I claim:

1. For use in the repair of an automatic transmission unit of the type having a casing, a clutch assembly mounted on said casing, and a servo assembly operatively connected to said clutch assembly and effective when actuated to operate said clutch assembly, thereby to vary the transmission ratio of said transmission unit, said casing comprising a wall having a hole therein, said servo assembly having an aperture therethrough extending to an outer surface thereof and being normally secured on said wall by a fastener passing through said aperture and engaging said hole, said wall having the tendency to crack at a section thereof adjacent said hole as a result of force applied thereto by said servo assembly, and an auxiliary assembly located adjacent to said hole and secured to said casing independently of said crack-susceptible wall section; a repair bracket for use when said wall is so cracked said fastener being removed from said aperture in said servo assembly and said servo assembly being positioned on said wall, said bracket comprising a plate secured to said auxiliary assembly, a first rigid part projecting from said plate substantially at right angles thereto, having a width substantially equal to the diameter of said aperture in said servo assembly, and inserted into said aperture, and a second rigid part extending from said plate and overlying and engaging said outer surface of said servo assembly, thereby to effectively and rigidly secure said servo assembly to said casing without the need for repairing said wall.

2. The repair bracket of claim 1, in which said second part comprises a rigid finger separate from said first part.

3. The repair bracket of claim 2, in which said servo assembly comprises a vertical rib, said finger engaging a side surface of said rib, thereby to limit the transverse movement of said servo assembly.

4. The repair bracket of claim 2, in which said second part further comprises a pair of surfaces arranged at each side of said first part and abutting against said outer surface of said servo assembly at each side of said aperture, said finger and said surfaces thereby defining means effective to limit movement of said servo assembly in a direction substantially normal to said outer surface.

5. The repair bracket of claim 4, in which said auxiliary assembly is a valve assembly operatively connected to said servo assembly and effective to control the flow of hydraulic fluid thereto, said valve assembly having an inlet port adapted to allow the flow of hydraulic fluid into said valve assembly from said casing, said plate being secured to said auxiliary assembly over said inlet port and having formed therein an opening in registry with said inlet port when said bracket is secured to said valve assembly, thereby to permit the flow of fluid into said valve assembly.

6. The repair bracket of claim 5, in which said servo assembly comprises a vertical rib, said finger engaging a side surface of said rib, thereby to limit the transverse movement of said servo assembly.

7. The repair bracket of claim 5, in which a fluid filter is normally secured to said valve assembly by a plurality of fasteners passing into a set of holes in said valve assembly, said plate having a set of openings in registry with said set of holes, said fasteners passing through said sets of holes and openings, thereby to secure said bracket to said valve assembly in overlying relation to said filter.

8. The repair bracket of claim 7, in which said servo assembly comprises a vertical rib, said finger engaging a side surface of said rib, thereby to limit the transverse movement of said servo assembly.

9. The repair bracket of claim 4, in which said servo assembly comprises a vertical rib, said finger engaging a side surface of said rib, thereby to limit the transverse movement of said servo assembly.

10. The repair bracket of claim 1, in which said auxiliary assembly is a valve assembly operatively connected to said servo assembly and effective to control the flow of hydraulic fluid thereto, said valve assembly having an inlet port adapted to allow the flow of hydraulic fluid into said valve assembly from said casing, said plate being secured to said auxiliary assembly over said inlet port and having formed therein an opening in registry with said inlet port when said bracket is secured to said valve assembly, thereby to permit the flow of fluid into said valve assembly.

11. The repair bracket of claim 10, in which a fluid filter is normally secured to said valve assembly by a plurality of fasteners passing into a set of holes in said valve assembly, said plate having a set of openings in registry with said set of holes, said fasteners passing through said sets of holes and openings, thereby to secure said bracket to said valve assembly in overlying relation to said filter.

12. The repair bracket of claim 1, in which said second part comprises a pair of surfaces arranged at each side of said first part and abutting against said outer surface of said servo assembly at each side of said aperture.

13. The repair bracket of claim 12, in which said auxiliary assembly is a valve assembly operatively connected to said servo assembly and effective to control the flow of hydraulic fluid thereto, said valve assembly having an inlet port adapted to allow the flow of hydraulic fluid into said valve assembly from said casing, said plate being secured to said auxiliary assembly over said inlet port and having formed therein an opening in registry with said inlet port when said bracket is secured to said valve assembly, thereby to permit the flow of fluid into said valve assembly.

14. The repair bracket of claim 13, in which a fluid filter is normally secured to said valve assembly by a plurality of fasteners passing into a set of holes in said valve assembly, said plate having a set of openings in registry with said set of holes, said fasteners passing through said sets of holes and openings, thereby to secure said bracket to said valve assembly in overlying relation to said filter.

15. The repair bracket of claim 2, in which said auxiliary assembly is a valve assembly operatively connected to said servo assembly and effective to control the flow of hydraulic fluid thereto, said valve assembly having an inlet port adapted to allow the flow of hydraulic fluid into said valve assembly from said casing, said plate being secured to said auxiliary assembly over said inlet port and having formed therein an opening in registry with said inlet port when said bracket is secured to said valve assembly thereby to permit the flow of fluid into said valve assembly.

16. The repair bracket of claim 15, in which a fluid filter is normally secured to said valve assembly by a plurality of fasteners passing into a set of holes in said valve assembly, said plate having a set of openings in registry with said set of holes, said fasteners passing through said sets of holes and openings, thereby to secure said bracket to said valve assembly in overlying relation to said filter.

References Cited

UNITED STATES PATENTS 3,154,176   10/1964   Smith _____ 29—401 X

LEONARD H. GERIN, Primary Examiner

U.S. Cl. X.R.

29—401